Nov. 12, 1968   D. E. EVANS   3,410,519
RELIEF VALVE
Filed Jan. 24, 1966   2 Sheets-Sheet 1
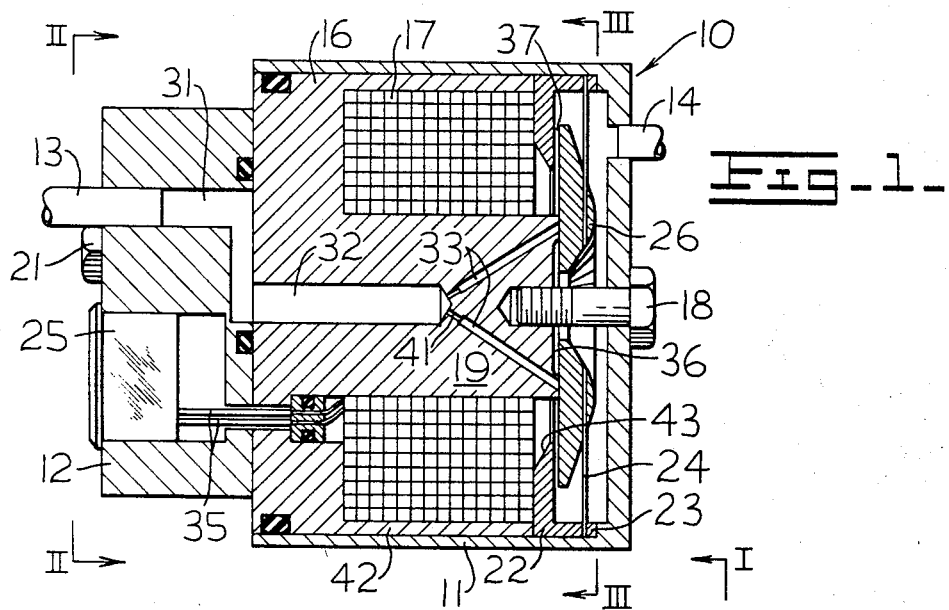
Fig-1-
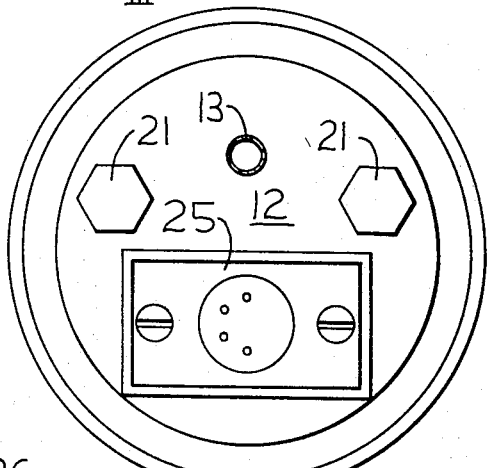
Fig-2-
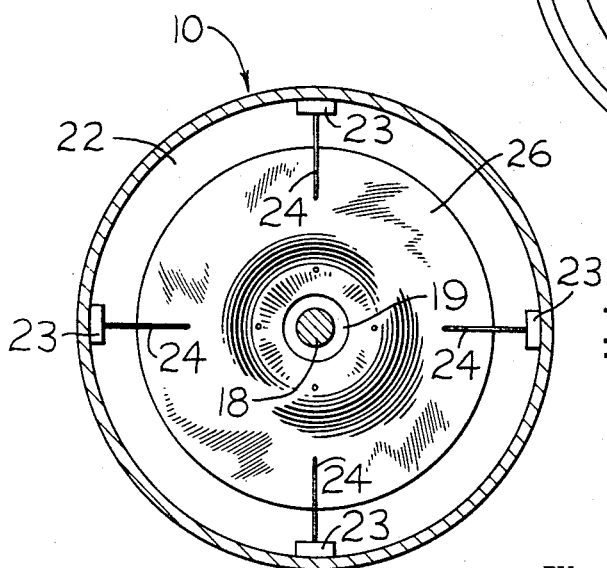
Fig-3-
INVENTOR.
DUANE E. EVANS
BY Fryer, Tjensvold, Feix & Phillips
ATTORNEYS Nov. 12, 1968     D. E. EVANS     3,410,519
RELIEF VALVE
Filed Jan. 24, 1966     2 Sheets-Sheet 2
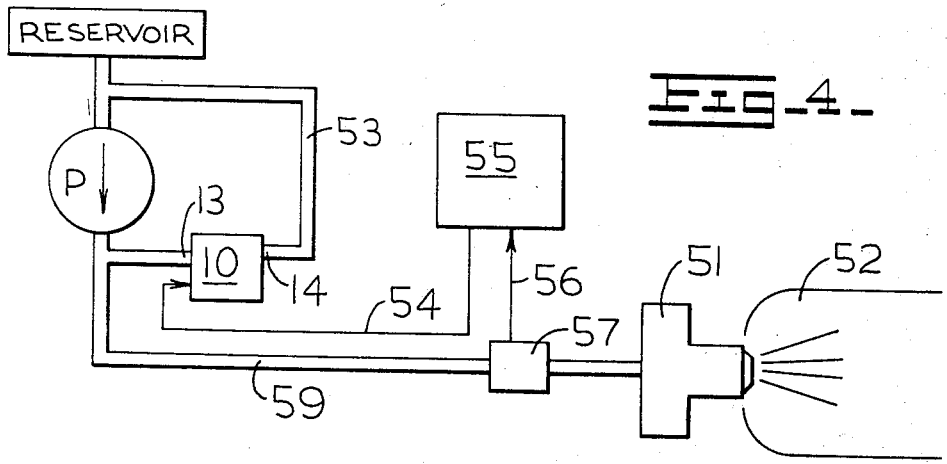
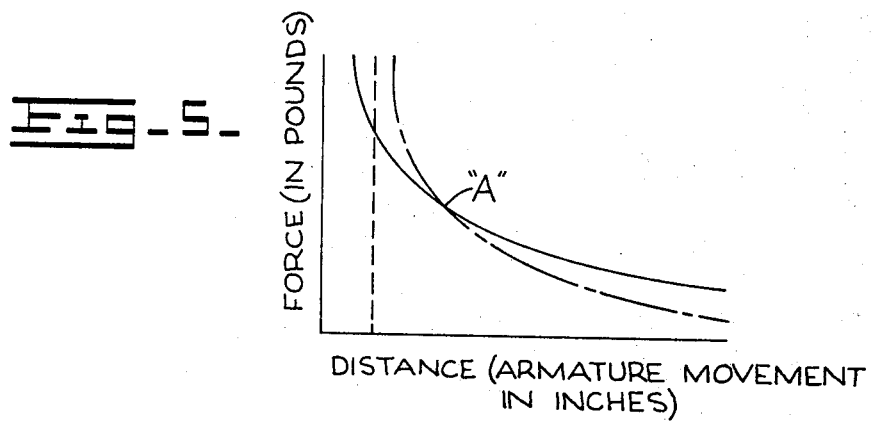
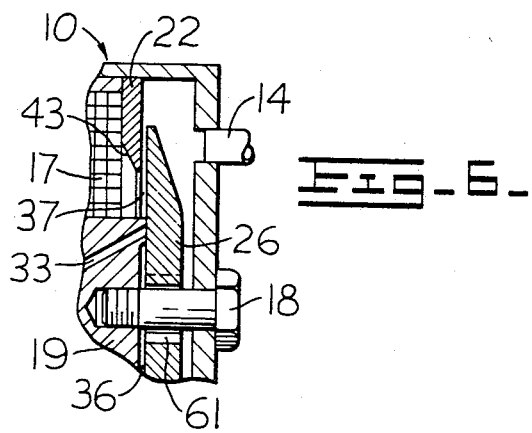
INVENTOR.
DUANE E. EVANS
BY Fryer, Tjensvold, Feix & Phillips
ATTORNEYS United States Patent Office 3,410,519
Patented Nov. 12, 1968

3,410,519
RELIEF VALVE
Duane E. Evans, Peoria, Ill., assignor to Caterpillar Tractor, Peoria, Ill., a corporation of California
Filed Jan. 24, 1966, Ser. No. 522,446
5 Claims. (Cl. 251—141)

ABSTRACT OF THE DISCLOSURE

To modulate and control the pressure in a hydraulic system an electrically controlled pressure relief valve is disposed therein. The valve includes an electromagnet having a central core enclosing a fluid passage through which system fluid may pass subject to the flow thereof being selectively impeded by an armature which seats with the electromagnet at the mouth of the fluid passage and which is under the influence of the opposing forces of magnetic attraction and system fluid impingement.

---

This invention relates generally to relief valves and more particularly to electrically controlled pressure relief valves for regulating system pressure as a means for controlling flow in hydraulic circuits.

While mechanically controlled and hydraulically controlled relief valves are well known in the art, electrically controlled relief valves with their superior versatility are relatively uncommon. Further, those electrically controlled valves which are commercially available predominantly control orifice area or flow rather than pressure, are excessively complex and costly, are relatively more sensitive to dirt, and employ extremely close fits and tolerances. Since it is common for these prior art valves to control flow other than by regulating pressure, they may suffer from the disadvantage that their operating system pressures are detrimentally high. Additionally, the hydraulic circuits in which they operate usually require mechanical maximum system pressure relief valves. Electrically controlled valves offer the advantage that they may easily be remotely controlled, and their controls conveniently gathered together with other controls at a central console. By regulating pressure, the relief valve of the present invention permits the hydraulic circuit to operate at a relatively low average pressure which increases the life of the pump.

It is an object of the present invention to provide an electrically controlled pressure relief valve for use as a means to control fluid flow in a hydraulic circuit or for use as a pilot valve.

It is another object of the present invention to provide an electrically controlled pressure relief valve which has a high rate of response to a controlling signal.

It is yet another object of the present invention to provide an electrically controlled pressure relief valve, the movable armature of which seeks to operate at an equilibrium condition between the force of magnetic attraction and the reverse force caused by the hydraulic fluid impinging on the armature.

Further and more specific objects and advantages of the invention are made apparent in the following specification wherein a preferred form of the invention is described in detail by reference to the accompanying drawings.

In the drawings:

FIG. 1 is a view in cross-sectional side elevation of an electrically controlled pressure relief valve embodying the preferred form of the present invention;

FIG. 2 is a view in end elevation taken along the lines and in the direction of arrows II—II;

FIG. 3 is a view in end elevation taken along the lines and in the direction of arrows III—III;

FIG. 4 is a schematic diagram of the pressure relief valve of the present invention in the environment of a gas turbine fuel control system;

FIG. 5 is a graph illustrating the type of magnetic force curve and hydraulic force curve which allow the armature to seek out and operate at an equilibrium condition; and FIG. 6 is a fragmentary view in side elevation illustrating a modified form of the armature.

Referring first to FIGS. 1, 2 and 3 of the drawings, an electrically controlled pressure relief valve embodying the present invention is shown generally at 10 and includes a housing 11, an end piece 12 and fluid inlet and outlet ports 13 and 14, respectively.

Magnetic core 16 substantially encloses a coil winding 17 and together they form an electromagnet which is enclosed within the housing and the end piece. A bolt 18 serves to secure central core portion 19 to the housing, and bolts 21 serve to secure the end piece to the upstream end of the magnetic core. An annular ring 22 coaxial with the longitudinal axis of the central core portion 19 has forwardly projecting tangs 23 each of which carry a wire 24.

An annular armature 26 also coaxial with the longitudinal axis of the central core portion 19 is disposed between the front or downstream end of the central core portion and the front end of the housing for reciprocal movement relative to the face of the central core portion and the annular ring 22. Wires 24 support the armature and allow it to have reciprocal movement along an extension of the longitudinal axis of the central core portion.

A passageway 31 in the end piece is in fluid communication with a passageway 32 in the central core portion 19. A series of twelve passageways, two of which are designated by the reference numeral 33, are spaced 30° apart, and they provide fluid communication between the central passageway 32 and the end of the central core portion. As illustrated in FIG. 1, the annular armature is disposed to impede or substantially block the flow of fluid leaving passageways 33. It will, of course, be understood that the greater the magnetic force of attraction between the electromagnet and the movable armature, the greater will the flow of fluid escaping from passageways 33 be impeded.

The coil winding 17 is energized from a source of electrical energy, not shown, through an electrical panel shown generally at 25 in the end piece. Conductors 35 lead from the panel to the coil winding.

The downstream or forward end of the central core portion 19 is recessed as at 36 to prevent any build-up of excess pressure between the mating faces of the central core portion and the armature.

Referring to the graph of FIG. 5, the solid line represents a magnetic force curve for a particular magnitude of magnetizing current, and the broken line represents a hydraulic pressure force curve. The armature is urged to move away from the downstream end of the central core portion 19 under the displacing influence of the force of the hydraulic fluid leaving passageways 33 and against the magnetic force of attraction exerted by the electromagnet on the armature.

The armature completes the magnetic circuit which consists of the armature, magnetic core 16 including both central core portion 19 and annular portion 42, annular ring 22 and air gap 37. Consequently, when the electromagnet is energized, the armature is urged by the magnetic force of attraction in a direction opposite to the direction that the hydraulic fluid force urges it.

A feature of the present invention is that the armature seeks and attempts to remain in an equilibrium condition. More specifically, whenever a transient pressure imbalance is imposed on the fluid system, the armature seeks to remain at that distance from the central core portion where the hydraulic force acting on the armature is counterbalanced by the magnetic force also acting on the armature. In order to achieve this feature it is necessary to provide a hydraulic force curve and a magnetic force curve having characteristics like that shown in the graph of FIG. 5. Specifically it is required that for any distance less than the distance at the equilibrium point, graphically shown as point A where the curves intersect, the hydraulic force must exceed the magnetic force. However, for any distance greater than the distance at the equilibrium point, the magnetic force must exceed the hydraulic force. These characteristics insure that should any transient pressure imbalance cause the armature to move away from its equilibrium point, the differential in the magnitudes then existing between the two forces will work to return the armature to its equilibrium point.

The specific features in the relief valve of the present invention which are mainly responsible for achieving curves having these characteristics are air gap 37, recess or air gap 36, and restricting orifices 41 in passageways 33. Referring to the graph of FIG. 5, the dotted line parallel to the vertical axis represents the magnitude in inches of the air gap 37 and illustrates how, by properly dimensioning this air gap, the steep portion of the magnetic force curve is cut off. Also by varying the dimension of air gaps 36 and 37 other desired forms of the magnetic force curve can be obtained. To increase the steepness of the hydraulic force curve, the cross-sectional area of restricting orifices 41 can be decreased.

The armature is shown in its preferred shape. This shape gives it the highest force of magnetic attraction for a given mass. Annular ring 22 is bevelled at 43 to minimize the flux leakage across gap 37. The upstream or mating face of the armature is limited to movement substantially parallel to both the mating face of central core portion 19 and of the annular ring 22 because of the symmetry of passageways 33 from which a balanced stream of fluid can impinge circumferentially about the mating face of the armature. Also the symmetry of the location of passageways 33 provides the armature with a self-straightening feature. Any erratic influence which might cause the armature to move out of parallel, for example, to pivot to the right would be overcome and corrected by the increased differential in hydraulic force at the bottom. This self-straightening feature of the armature can be enhanced by further decreasing the cross-sectionl area of the restricting orifices 41.

One of the typical uses of the present invention is in the environment of a fuel control system for a gas turbine engine. The schematic of FIG. 4 illustrates such a system which is described and claimed in assignee's copending U.S. Patent application Ser. No. 532,436, which was filed Mar. 7, 1966, and wherein the electrically controlled pressure relief valve of the present invention is designated at 10. A pressure pump P supplies fuel from the reservoir to fuel orifice 51 of combustion chamber 52. The pressure relief valve 10 is connected into branch hydraulic circuit 53 so that upstream port 13 may divert some fuel away from the main conduit 59 through downstream port 14 back to the low pressure side of pump P. Coil 17 is controlled by an electrical control circuit shown schematically at 55 details of which are not necessary for an understanding of the present invention. Electrically associated with control circuit 55 is a strain gauge flow meter 57 of the type disclosed and claimed in the assignee's pending U.S. Patent application Ser. No. 453,004 and entitled, "Control System and Fuid Flow Transducer Therefor."

FIG. 6 illustrates an alternate manner by which the armature 26 may be supported. Here the armature is supported by a slip fit on bolt 18 and therefore the tang and wire arrangement of FIG. 3 is not required. Passages 61 are provided at the interior circumference of the armature to prevent any instability that may arise.

While the pressure relief valve of the present invention is susceptible to a wide and varied use, only two further examples of possible use will be explained. One such use is as a means to position the spring biased jack of a hydraulic pressure cylinder with respect to its head by remote electrical controls. Another such use as is the pilot stage of a multi-stage relief valve system in order to remotely control the pressure fluid systems characterized by very high rates of flow.

I claim:
1. In an electrically controlled relief valve for regulating the pressure in a hydraulic circuit the combination comprising:
   an electromagnet having a coil and having a core substantially E-shaped in cross-section, the core including a central core portion drilled to provide interconnecting first and second passage means for fluid communication from the upstream face of the core to the downstream face of the core, and where the second passage means, disposed downstream of said first passage means, comprise a plurality of equally circumferentially-spaced passageways terminating at the downstream face of the central core portion;
   an annular ring disposed coaxially with the longitudinal axis of the central core portion, abutting the downstream outer circumferential side of the electromagnet, the downstream face of said ring being juxtaposed a predetermined distance upstream of the downstream face of the central core portion, and forming with the core, part of a magnetic circuit which substantially enclose the coil;
   an annular armature disposed downstream of said ring and adjacent the downstream face of the central core portion for reciprocable movement substantially along an extension of said axis and adapted to selectively impede flow emanating from said passageways;
   an electromagnetic gap between overlapping interfacing portions of said ring and said armature and equal to said predetermined distance; and
   wherein the degree to which said armature impedes the flow depends on the opposing relative magnitudes of a first and second force, the first force being a force of magnetic attraction produced by said electromagnetic and acting between the downstream face of the central core portion and said armature, the second force being a force of fluid pressure caused by the impingement of fluid emanating from said passageways onto said armature,

2. The valve of claim 1 wherein the downstream face of the central core portion has a central and circular recess whose diameter is less than the diameter of the locus of said equally circumferentially-spaced passageways.

3. The valve of claim 2 further comprising supporting wires wherein the annular ring includes a plurality of tangs, and wherein one end of a supporting wire is secured to a tang and the other end is secured to the armature.

4. The valve of claim 2 further comprising a stud extending horizontally outwardly from the downstream end of the central core portion along an extension of said longitudinal axis, and wherein the inner diameter of the annular armature is of a size to cause a slip fit on the stud, and also wherein the annular armature is vented adjacent its inner diameter.

5. The valve of claim 1 where the interconnection between said first and second passage means includes stricture means constituting third passage means.

(References on following page)

References Cited

UNITED STATES PATENTS

| | | | |
|---|---|---|---|
| 2,263,819 | 11/1941 | Ray | 251—141 X |
| 2,543,455 | 2/1951 | Goepfrich | 251—129 X |
| 2,860,850 | 11/1958 | Rhodes, et al. | 251—139 |
| 3,001,757 | 9/1961 | Ball | 251—139 X |
| 3,133,234 | 5/1964 | Dietz | 251—141 X |
| 3,134,542 | 5/1964 | Smith | 251—141 X |
| 3,134,932 | 5/1964 | Ray | 251—141 X |
| 3,178,151 | 4/1965 | Caldwell | 251—139 X |
| 3,321,177 | 5/1967 | Fendel et al. | 251—139 X |
| 3,355,145 | 11/1967 | De Castelet | 251—141 |

FOREIGN PATENTS

| | | |
|---|---|---|
| 762,876 | 12/1956 | Great Britain. |
| 264,710 | 10/1949 | Switzerland. |

M. CARY NELSON, *Primary Examiner.*

ROBERT C. MILLER, *Assistant Examiner.*